(12) United States Patent
Baines

(10) Patent No.: US 10,112,524 B2
(45) Date of Patent: Oct. 30, 2018

(54) SYSTEM FOR SECURING A CAMPER TO A TRUCK BED

(71) Applicant: Stephen Vance Baines, Peru, IN (US)

(72) Inventor: Stephen Vance Baines, Peru, IN (US)

( * ) Notice: Subject to any disclaimer, the term of this patent is extended or adjusted under 35 U.S.C. 154(b) by 0 days.

(21) Appl. No.: 15/202,131

(22) Filed: Jul. 5, 2016

(65) Prior Publication Data

US 2018/0009361 A1    Jan. 11, 2018

(51) Int. Cl.
*B62D 24/00* (2006.01)
*B60P 7/08* (2006.01)
*B60P 3/32* (2006.01)

(52) U.S. Cl.
CPC ............ *B60P 7/0807* (2013.01); *B60P 3/32* (2013.01); *B62D 24/00* (2013.01)

(58) Field of Classification Search
CPC ........... B60P 7/0807; B60P 3/32; B62D 24/00
USPC ................. 296/164, 167, 26.09; 280/433
See application file for complete search history.

(56) References Cited

U.S. PATENT DOCUMENTS

| 3,901,548 A * | 8/1975 | Seaman, Jr. ............. B60J 7/062 135/137 |
| 5,305,774 A * | 4/1994 | Hager ....................... B60P 7/10 135/88.09 |
| 5,484,240 A | 1/1996 | Rosenberg |
| 6,328,364 B1 * | 12/2001 | Darbishire ............. B60P 1/003 296/26.09 |
| 6,491,331 B1 * | 12/2002 | Fox .......................... B60P 3/40 224/403 |
| 9,272,655 B2 * | 3/2016 | Eickhoff ................... B60P 3/32 |
| 2006/0108770 A1 * | 5/2006 | Burns ................ B62D 53/0814 280/433 |

* cited by examiner

*Primary Examiner* — Joseph D. Pape
(74) *Attorney, Agent, or Firm* — Ice Miller LLP

(57) ABSTRACT

A camper mounting assembly includes mounting rails, C-channels, a front bracket, and a rear bracket. The front bracket and rear bracket are attached to the camper, and the mounting rails are attached to the bed of a truck. The C-channels are secured to the mounting rails and facilitate installing and securing the camper to the truck bed. The C-channels can be easily removed to allow access to and use of the truck bed.

19 Claims, 5 Drawing Sheets

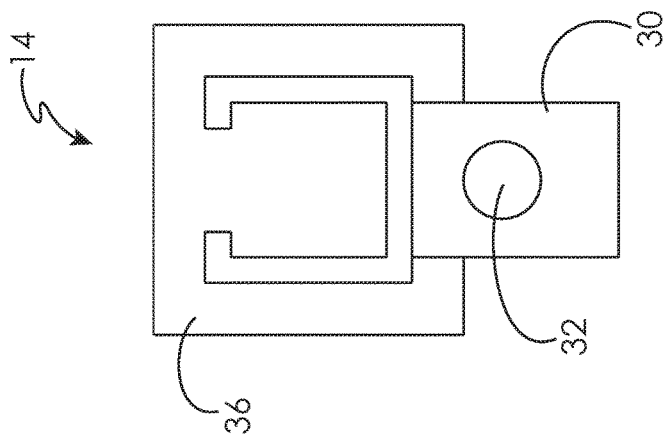
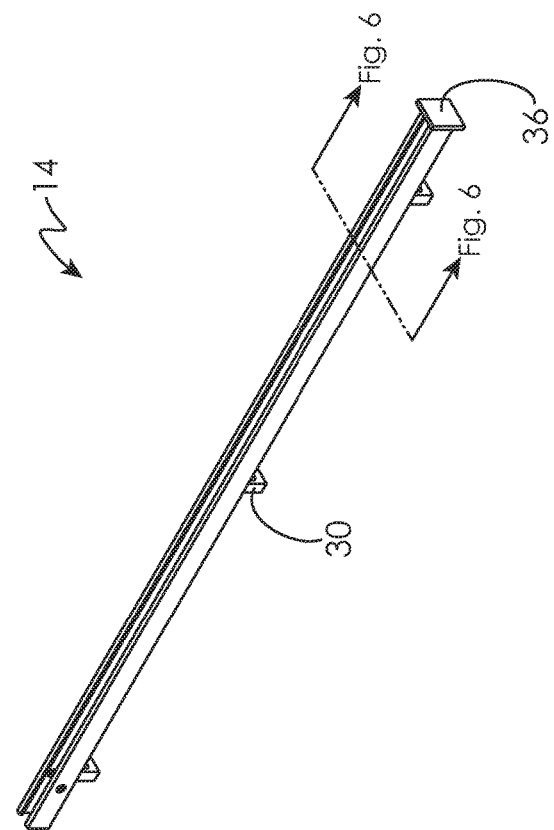
Fig. 6
Fig. 5

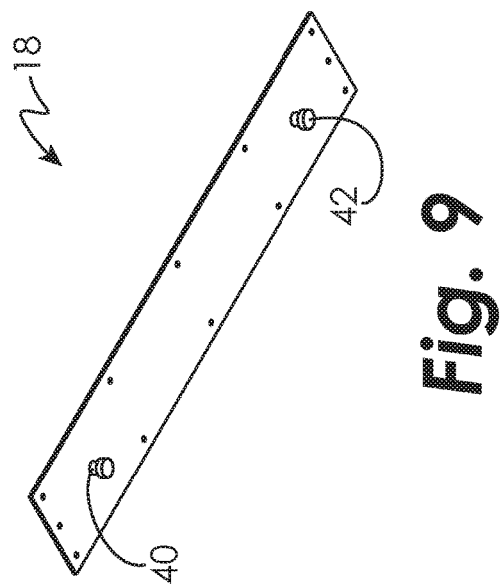
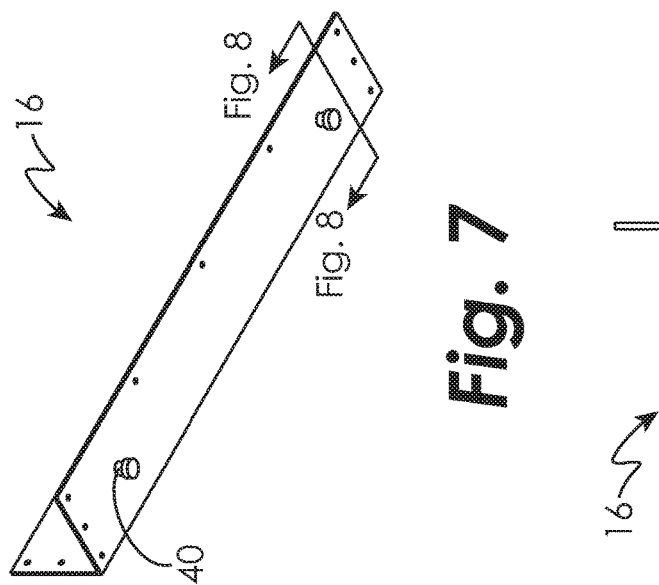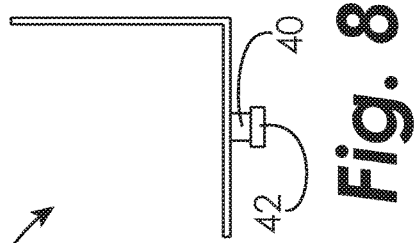

SYSTEM FOR SECURING A CAMPER TO A TRUCK BED

TECHNICAL FIELD OF THE DISCLOSED EMBODIMENTS

The presently disclosed embodiments generally relate to mounting systems for truck beds and, more particularly, to a system for securing a camper to a truck bed.

BACKGROUND OF THE DISCLOSED EMBODIMENTS

Truck bed campers, also known as slide-in campers or cab-over campers, are recreational vehicles that slide into a truck bed and are attached to the truck. Generally, four tie-downs are positioned on the truck to provide anchor points for attaching the camper. Two front tie-downs can be mounted to the bed or frame of the truck, and two rear tie-downs are commonly mounted to the bumper of the truck. Anchors on the camper are then connected to the tie-downs on the truck using turnbuckles, which provide a certain amount of tension to secure the camper to the truck.

The turnbuckles of the existing mounting system require frequent adjustment and may require removal to access certain areas of the truck such as, for example, the gas cap. Additionally, the turnbuckles and tie-downs are on the exterior of the truck and create an aesthetically unattractive appearance.

There is therefore a need for a system for securing a camper to a truck bed which is more aesthetically appealing and provides a mounting system within the truck bed. There is also a need for a more stable system for securing a camper to a truck bed which eliminates the need for frequent adjustments.

SUMMARY OF THE DISCLOSED EMBODIMENTS

In one embodiment, a camper mounting assembly is provided. The camper mounting assembly includes a front bracket, rear bracket, C-channels, and mounting rails. The front bracket and rear bracket are attached to the camper, and the mounting rails are attached to the truck. The C-channels are secured to the mounting rails and facilitate installing and securing the camper to the truck bed.

In one embodiment, at least two mounting rails are installed in the truck bed and attached to the frame of the truck so that the weight of the camper is evenly distributed over the axle of the truck. In an embodiment, the mounting rails are U-shaped with flanges that extend out from each end such that the flanges can be fastened to the bed of a truck using the pilot holes located on the flanges. In another embodiment, the mounting rails are attached to the frame of the truck using an L-bracket. It should be understood by one of skill in the art that the mounting rails may be secured to the truck frame by a variety of mounting brackets depending on the application.

When the mounting rails are secured to the truck, the U-shaped portion of the mounting rails extends above the surface of the truck bed creating a space between the mounting rail and the truck bed. In one aspect, the base of the U-shaped portion of the mounting rails that is located above and opposite the truck bed includes slots for installing the C-channels to the mounting rails. The sides of the U-shaped portion of the mounting rails also include complementary holes that correspond and align with each slot of the mounting rails. It should be appreciated by one of skill in the art that the number and shape of the slots and the corresponding holes may vary based on the type of installation required.

In another embodiment, the C-channels allow the camper to be easily installed in the truck bed and secured to the mounting rails. The C-channels include tabs that are secured to the C-channel and extend from the back of the C-channel in the opposite direction of the C. The tabs are sized to fit into the slots of the mounting rails and extend into the space created between the U-shaped portion of the mounting rails and the truck bed. As a result, the C-channels can be easily removed when the camper is not installed to allow for access and use of the truck bed. It should be understood by one of skill in the art that the length of the C-channels will vary based on the length of the truck bed.

In one embodiment, the tabs of the C-channels include a hole that aligns with the complementary holes of the mounting rails when the tabs are inserted into the slots of the mounting rails. In one embodiment, a pin can be used to secure the tabs of the C-channels to the mounting rails by inserting the end of the pin through the hole on one side of the U-shaped portion of the mounting rails, then through the hole in the tab of the C-channel, and finally through the complementary hole on the other side of the U-shaped portion of the mounting rails. In another embodiment, the end of the pin that extends through and past the side of the mounting rail includes holes for inserting a clip.

In another embodiment, the C-channels include stops that prevent the camper from sliding forward. In a further embodiment, the front ends of the C-channels that are near the passenger compartment of the truck include stops that close the C-channels and prevent the camper from sliding forward. In one embodiment, the camper mounting assembly provides for a small gap between the front of an installed camper and the truck to prevent rubbing. It should be appreciated by one of skill in the art that the number of C-channels secured to the mounting rails will vary based on the particular installation.

In one embodiment, the front bracket is mounted to the bottom of the camper. In a further embodiment, the front bracket is an L-shaped bracket such that the front bracket is secured to the bottom front of the camper and the front of the bottom of the camper. In one embodiment, the rear bracket is mounted to the bottom of the camper. In a further embodiment, the rear bracket is installed near the rear of the bottom of the camper. In an embodiment, the rear bracket is planar. In another embodiment, the front bracket and rear bracket are installed directly to the frame of the camper. In a further embodiment, the front bracket and rear bracket are constructed of ¼ inch steel.

In one embodiment, the front bracket and the rear bracket include kingpins fastened to the bottom thereof such that the kingpins align with and can be inserted into the C-channels. In one embodiment, the kingpins are welded to the front bracket and the rear bracket. The head of the kingpin is located opposite the camper and is of a sufficient width that the kingpin fits into the C-channel from the rear end of the C-channel located opposite the passenger compartment of the truck but cannot be removed through the channel opening. It would be appreciated by one of skill in the art that the number of kingpins attached to the front bracket and rear bracket will vary based on the number of C-channels used for the particular installation.

In one embodiment, the kingpins of the front bracket are aligned with the C-channels attached to the truck bed such that the camper easily slides into the truck bed. In another embodiment, once the kingpins of the rear bracket have slid into the C-channel, a pin and clip can be secured through opposing holes in the sides of the rear end of the C-channels. In another embodiment, a center bracket can be installed on the bottom of the camper centered between the front bracket and rear bracket.

In another embodiment, the camper mounting assembly is adapted for use with a transport trailer equipped for delivery of camper units. In a further embodiment, the camper mounting assembly is adapted for use for roll-off boxes and other industrial applications.

BRIEF DESCRIPTION OF DRAWINGS

The embodiments and other features, advantages, and disclosures contained herein, and the manner of attaining them, will become apparent and the present disclosure will be better understood by reference to the following description of various exemplary embodiments of the present disclosure taken in conjunction with the accompanying drawings, wherein:

FIG. 5 is a front-side perspective view of a C-channel in accordance with an embodiment;

FIG. 6 is a rear view of a C-channel in accordance with an embodiment;

FIG. 7 is a bottom-side perspective view of a front bracket in accordance with an embodiment;

FIG. 8 is a side view of a front bracket in accordance with an embodiment; and

FIG. 9 is a bottom-side perspective of a rear bracket in accordance with an embodiment.

DETAILED DESCRIPTION OF THE DISCLOSED EMBODIMENTS

Figure 1:
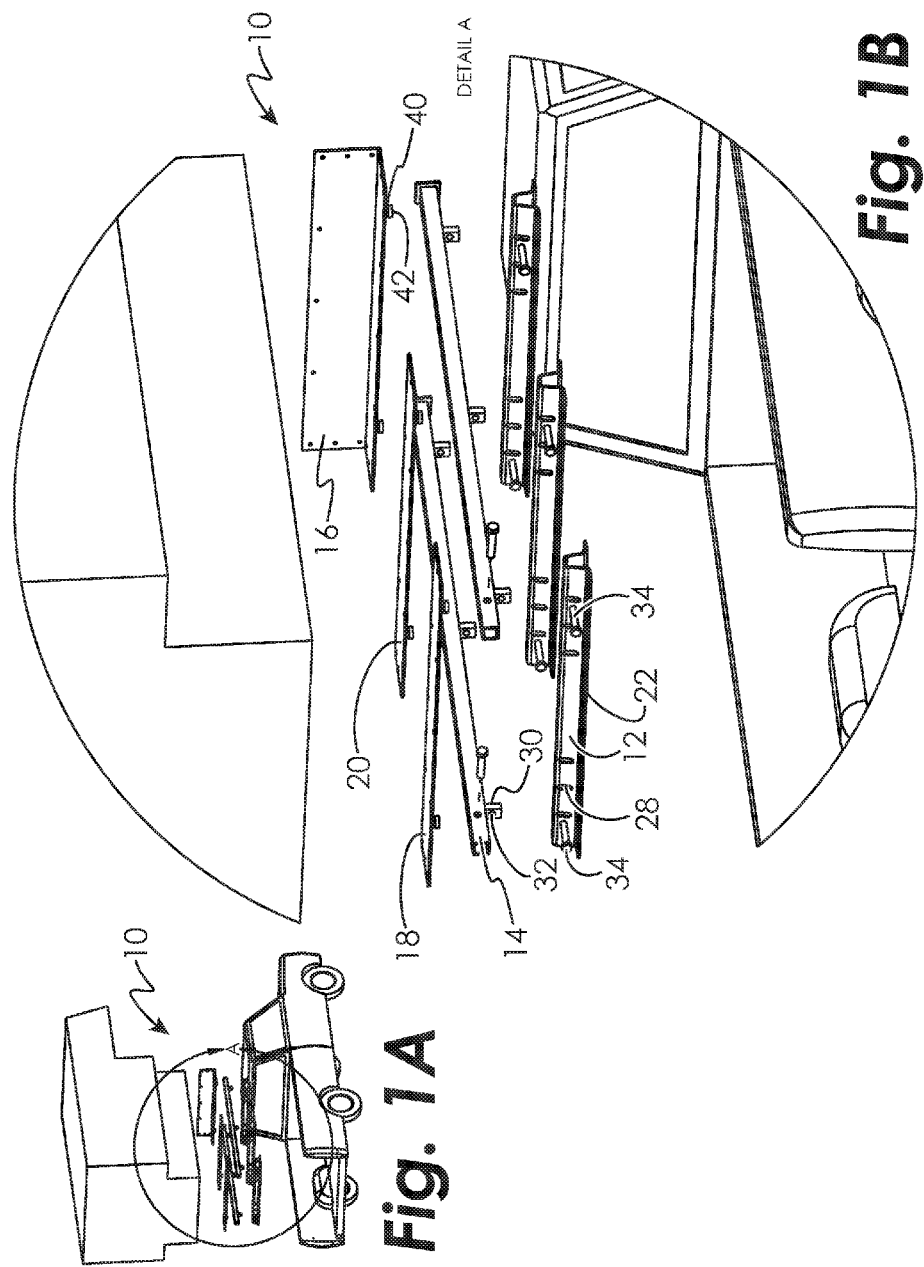
FIG. 1A is an exploded view of a camper mounting assembly, truck, and camper in accordance with an embodiment.
FIG. 1B is a detail exploded view of a camper mounting assembly, truck, and camper in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
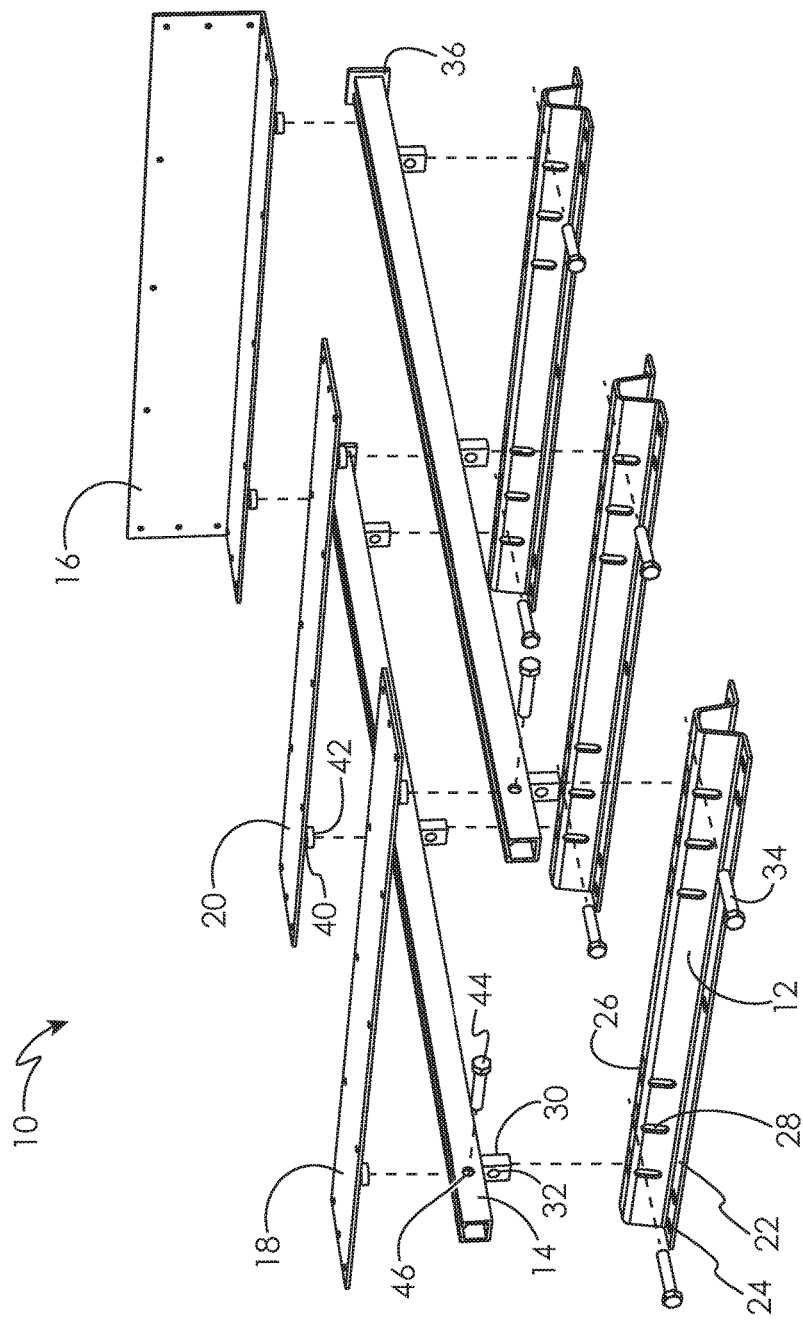
FIG. 2 is an exploded view of a camper mounting assembly in accordance with an embodiment.

FIGS. 1A, 1B, and 2 illustrate an exploded view of an embodiment of a camper mounting assembly 10 in accordance with the present disclosure. The camper mounting assembly 10 includes mounting rails 12, C-channels 14, a front bracket 16, rear bracket 18, and center bracket 20.

Figure 3:
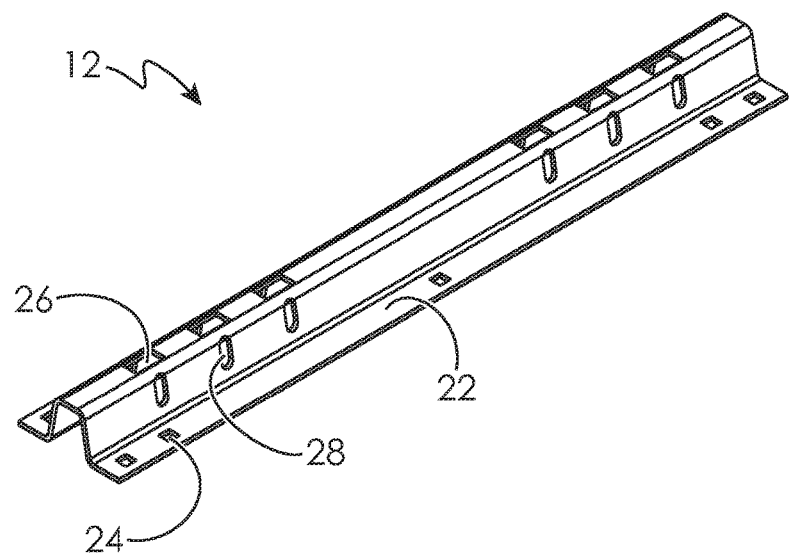
FIG. 3 is a side perspective view of a mounting rail in accordance with an embodiment.
Figure 4:
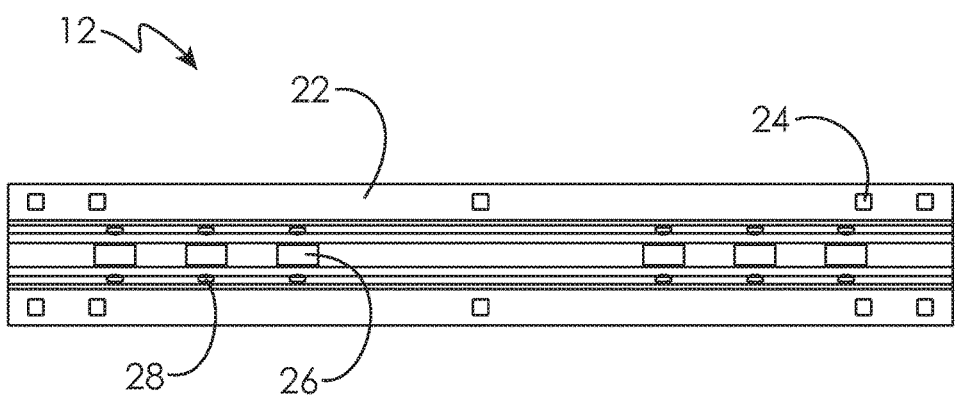
FIG. 4 is a top view of a mounting rail in accordance with an embodiment.

As shown in FIGS. 3 and 4, the mounting rails 12 are U-shaped with flanges 22 that extend out from each end such that the flanges 22 can be fastened to the bed of a truck using the pilot holes 24 located on the flanges 22. When the mounting rails 12 are secured to the truck, the U-shaped portions of the mounting rails 12 extend above the surface of the truck bed. The base of the U-shaped portions of the mounting rails 12 which are located above and opposite the truck bed includes slots 26 for installing the C-channels 14 to the mounting rails 12. The sides of the U-shaped portion of the mounting rails 12 also include complementary side holes 28 that correspond to each slot 26 of the mounting rails 12. It would be appreciated by one of skill in the art that the number and shape of the slots 26 and the corresponding side holes 28 may vary based on the type of installation required.

FIGS. 5 and 6 illustrate an embodiment of the C-channels 14 that allow the camper to be easily secured to the mounting rails 12 and truck bed. The C-channels 14 include tabs 30 that are secured to the C-channels 14 and extend from the back of the C-channels 14 in the opposite direction of the C. The tabs 30 are sized to fit into the slots 26 of the mounting rails 12 and extend into the space created between the U-shaped portion of the mounting rails 12 and the truck bed. In this embodiment, the tabs 30 also include a tab hole 32 that aligns with the complementary side holes 28 of the mounting rails 12 when the tabs 30 of the C-channels 14 are inserted into the slots 26 of the mounting rails 12. As shown in FIGS. 1B and 2, a pin 34 can be used to secure the tabs 30 of the C-channels 14 to the mounting rails 12 by successively inserting the end of the pin 34 through the a side hole 28 on the side of the U-shaped portion of the mounting rails 12, then through the tab hole 32 in the tab 30 of the C-channel 14, and finally through the complementary side hole 28 on the other side of the U-shaped portion of the mounting rails 12. In an embodiment, the end of the pin 34 that extends past the mounting rail 12 includes holes for inserting a clip. The front ends of the C-channels 14 that are near the passenger compartment of the truck include stops 36 that close the C-channels 14 and prevent the camper from sliding forward. It would be appreciate by one of skill in the art that the number of C-channels 14 secured to the mounting rails 12 will vary based on the particular installation. It would also be appreciated by one of skill in the art that the location of the stops 36 on the C-channels 14 may vary based on the type of installation required.

FIGS. 7 and 8 show an embodiment of the front bracket 16 that is mounted to the front and bottom of the camper, as shown in FIGS. 1A and 1B. The front bracket 16 is an L-shaped bracket such that the front bracket 16 is secured to the bottom front of the camper and the front of the bottom of the camper. As shown in FIGS. 1A and 1B, a rear bracket 18 is installed near the rear of the bottom of the camper. FIG. 9 illustrates an embodiment of the rear bracket 18 showing a planar configuration. The front bracket 16 and rear bracket 18 include kingpins 40 fastened to the bottom thereof such that the kingpins 40 align with and can be inserted into the C-channels 14. The head 42 of the kingpin 40 is located opposite the camper and is of a sufficient width that the kingpin 40 fits into the C-channel 14 from the rear end of the C-channel 14 but cannot be removed through the opening in the C-channel 14. It will be appreciated by one of skill in the art that the number of kingpins 40 attached to the front bracket 16 and rear bracket 18 will vary based on the number of C-channels 14 used for the particular installation.

In this embodiment, the kingpins 40 of the front bracket 16 are aligned with the C-channels 14 attached to the truck bed such that the camper easily slides into the truck bed. Once the kingpins 40 of the rear bracket 18 have slid into the C-channel, a pin 44 and clip can be secured through opposing channel holes 46 in the sides of the rear of the C-channels 14, as shown in FIG. 2. In another embodiment, as shown in FIGS. 1A, 1B, and 2, a center bracket 20 can be installed on the bottom of the camper centered between the front bracket 16 and rear bracket 18.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A camper mounting assembly for mounting a slide-in camper on a truck bed, the camper mounting assembly comprising:
    at least two mounting rails adapted to be fastened to the truck bed;
    at least two C-channels adapted to be secured to the at least two mounting rails, wherein each of the at least two C-channels comprises an open slot formed therein on a top side opposite the truck bed; and
    at least one bracket adapted to be secured to a bottom of the slide-in camper, wherein each of the at least one bracket is adapted to be slidingly received within the open slot of one of the at least two C-channels.

2. The camper mounting assembly of claim 1, wherein each of the at least two mounting rails comprise a U-shaped portion with a plurality of flanges extending therefrom, wherein the flanges are adapted to be secured to the truck bed.

3. The camper mounting assembly of claim 2, wherein the U-shaped portion comprises a base and first and second sides extending therefrom.

4. The camper mounting assembly of claim 3, wherein the base comprises at least two slots for installing the at least two C-channels.

5. The camper mounting assembly of claim 4, wherein each of the two sides comprise a plurality of side holes that align with complementary ones of the at least two slots.

6. The camper mounting assembly of claim 5, wherein each of the at least two C-channels comprise at least two tabs that are attached to the C-channel and sized to fit inside complementary ones of the at least two slots of the at least two mounting rails.

7. The camper mounting assembly of claim 6, wherein each of the at least two tabs comprise a tab hole that aligns with complementary ones of the plurality of side holes of the at least two mounting rails such that a pin can be successively inserted through complementary ones of the plurality of side holes in a first one of the two sides, the tab hole in the complementary one of the at least two tabs, and then the complementary one of the plurality of side holes in a second one of the two sides to install the at least two C-channels to the at least two mounting rails.

8. The camper mounting assembly of claim 1, wherein each of the at least two C-channels comprise stops to prevent the camper from moving forward once installed.

9. The camper mounting assembly of claim 1, wherein the at least one bracket comprises a front bracket and a rear bracket.

10. The camper mounting assembly of claim 9, wherein the front bracket is L-shaped such that the front bracket is adapted to be secured to the bottom and a front of the slide-in camper.

11. The camper mounting assembly of claim 9, wherein the front bracket comprises at least two kingpins extending therefrom such that each kingpin aligns with and can be inserted into a respective one of the at least two C-channels.

12. The camper mounting assembly of claim 9, wherein the rear bracket comprises at least two kingpins extending therefrom such that each kingpin aligns with and can be inserted into a respective one of the at least two C-channels.

13. A method of coupling a slide-in camper to a truck bed, comprising the steps of:
    fastening at least two mounting rails to the truck bed;
    securing at least two C-channels to the at least two mounting rails, wherein each of the at least two C-channels comprises an open slot formed therein on a top side opposite the truck bed;
    attaching at least one bracket to a bottom of the slide-in camper; and
    sliding the slide-in camper with the attached at least one bracket into the truck bed such that each of the at least one bracket is slidingly received within the open slot of one of the at least two C-channels, thereby coupling the slide-in camper to the truck bed.

14. The method of claim 13, wherein the step of fastening the at least two mounting rails to the truck bed comprises:
    aligning each of the at least two mounting rails, wherein each of the at least two mounting rails comprise a U-shaped portion having a base and first and second sides extending therefrom, such that the U-shaped portion extends above the truck bed; and
    affixing a plurality of flanges extending from the U-shaped portion to the truck bed.

15. The method of claim 14, wherein the step of securing the at least two C-channels to the at least two mounting rails comprises:
    positioning at least two tabs attached to each of the at least two C-channels in alignment with at least two slots located on the base of the U-shaped portion of each of the at least two mounting rails;
    placing the at least two tabs inside the at least two slots; and
    inserting a pin successively through a side hole of the first side of the U-shaped portion, a tab hole in the tab, and then a complementary side hole in the second side of the U-shaped portion.

16. The method of claim 15 comprising inserting a clip through the pin to secure the pin in place.

17. The method of claim 13, wherein the step of attaching the at least one bracket to the bottom of the slide-in camper comprises:
    attaching a front bracket to the bottom of the slide-in camper; and
    attaching a rear bracket to the bottom of the slide-in camper.

18. The method of claim 17, wherein the step of sliding the slide-in camper with the attached at least one bracket into the truck bed comprises:
    aligning at least two kingpins extending from the front bracket with each of the at least two C-channels;
    sliding each of the at least two kingpins of the front bracket inside each of the at least two C-channels;
    aligning at least two kingpins extending from the rear bracket with each of the at least two C-channels; and
    sliding each of the at least two kingpins of the rear bracket inside each of the at least two C-channels.

19. The method of claim 18 comprising:
    pushing the slide-in camper into the truck bed until a stop on each of the at least two C-channels prevents the slide-in camper from moving forward; and
    inserting a pin through opposing channel holes located on each of the at least two C-channels to secure the slide-in camper in place.

* * * * *